US006871252B1

(12) United States Patent
Cline

(10) Patent No.: US 6,871,252 B1
(45) Date of Patent: Mar. 22, 2005

(54) METHOD AND APPARATUS FOR LOGICAL DETACH FOR A HOT-PLUG-IN DATA BUS

(75) Inventor: Leslie E. Cline, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,676

(22) Filed: Mar. 31, 2000

(51) Int. Cl.[7] .................. G06F 13/20; G06F 13/38; G06F 11/00; H03K 17/18
(52) U.S. Cl. .................. 710/313; 710/63; 326/30; 714/43
(58) Field of Search ................. 710/10, 102, 103, 710/129, 4, 301–304, 316; 326/30; 713/1, 323; 714/43, 44

(56) References Cited

U.S. PATENT DOCUMENTS

| | | | | |
|---|---|---|---|---|
| 5,754,870 A | * | 5/1998 | Pollard et al. | 713/323 |
| 5,781,028 A | * | 7/1998 | Decuir | 326/21 |
| 6,131,134 A | * | 10/2000 | Huang et al. | 710/302 |
| 6,141,719 A | * | 10/2000 | Rafferty et al. | 710/316 |
| 6,212,641 B1 | * | 4/2001 | Frank et al. | 713/323 |
| 6,256,682 B1 | * | 7/2001 | Gudan et al. | 710/14 |
| 6,351,809 B1 | * | 2/2002 | St. Pierre et al. | 710/10 |
| 6,393,588 B1 | * | 5/2002 | Hsu et al. | 714/43 |

FOREIGN PATENT DOCUMENTS

JP  407058800 A  *  3/1995  .......... H04L/29/06

OTHER PUBLICATIONS

Intel Corporation, "USB–APM Interactions", White Paper, Sep. 5, 1997.
Compaq Intel Microsoft, NEC, "Universal Serial Bus Specification", Rev 1.1, pp. i–48 and 107–153, Sep. 23, 1998.
Intel Microsoft Toshiba, "Advanced Configuration and Power Interface Specification", Rev. 1.0b, Feb. 2, 1999.

* cited by examiner

Primary Examiner—Mark H. Rinehart
Assistant Examiner—Christopher E. Lee
(74) Attorney, Agent, or Firm—Dennis A. Nicholls

(57) ABSTRACT

A method and apparatus for performing logical attachments and detachments in a hot-plug-in data bus is described. A hot-plug-in data bus may utilize pull-down resistors to keep bus signals near a low voltage level when bus units are physically detached. Active pull-up resistors may then raise the bus signals away from ground when the bus units are physically attached via cabling or other forms of interconnection. The pull-up resistors may be switched away from the pull-up voltage source, which allows the remaining pull-down resistors to pull the bus signals down to the voltage levels corresponding to physical detachment of the cabling.

18 Claims, 11 Drawing Sheets

METHOD AND APPARATUS FOR LOGICAL DETACH FOR A HOT-PLUG-IN DATA BUS

FIELD OF THE INVENTION

The present invention relates to a hot-plug-on data bus, and, more specifically, to a method and apparatus for logically attaching and detaching devices from a hot-plug-in data bus.

BACKGROUND

Many kinds of data buses have been developed for use in computer systems. Most of the early examples required that the computer system be powered down when attaching or detaching a device from the data bus.

More recently, buses have been designed that allow devices to be attached not only when the computer system is powered on, but moreover when the computer system is running. Software may recognize newly attached devices and enable their use without having to reboot the operating system. Buses that operate in this manner may be referred to as hot-plug-in data buses. Common examples of hot-plug-in data buses include the Universal Serial Bus (USB) (Universal Serial Bus Specification Compaq/Intel/Microsoft/NEC Revision 1.1, published Sep. 23, 1998), the Personal Computer Memory Card International Association (PCMCIA) PC Card bus (PCMCIA PC Card Standard Specification Release 2.01, published November 1992), and the Institute of Electrical and Electronic Engineers IEEE-1394 bus (IEEE Standard for a High Performance Serial Bus, IEEE Std. 1394–1995, published Aug. 30, 1996).

Once a device is attached to a hot-plug-in data bus, conventional operating system software schedules the periodic examination of the device (called "polling") to see if the device wishes to transfer data. However, there are times when it would be advantageous for the computer system to enter into a reduced power state. The computer system operating system may be prevented from allowing the entry into a reduced power state due to the polling schedule. The user would be required to physically detach the device or devices from the computer system in order to permit the entry into the reduced power state. Alternatively, non-standard operating system software could be written. Neither of these two alternatives are desirable.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for performing logical attachments and detachments in a hot-plug-in data bus is described. A hot-plug-in data bus may utilize pull-down resistors to keep bus signals near a low voltage level when bus units are physically detached. Active pull-up resistors may then raise the bus signals away from ground when the bus units are physically attached via cabling or other forms of interconnection. The pull-up resistors may be switched away from the pull-up voltage source, which allows the remaining pull-down resistors to pull the bus signals down to the voltage levels corresponding to physical detachment of the cabling.

Figure 1:
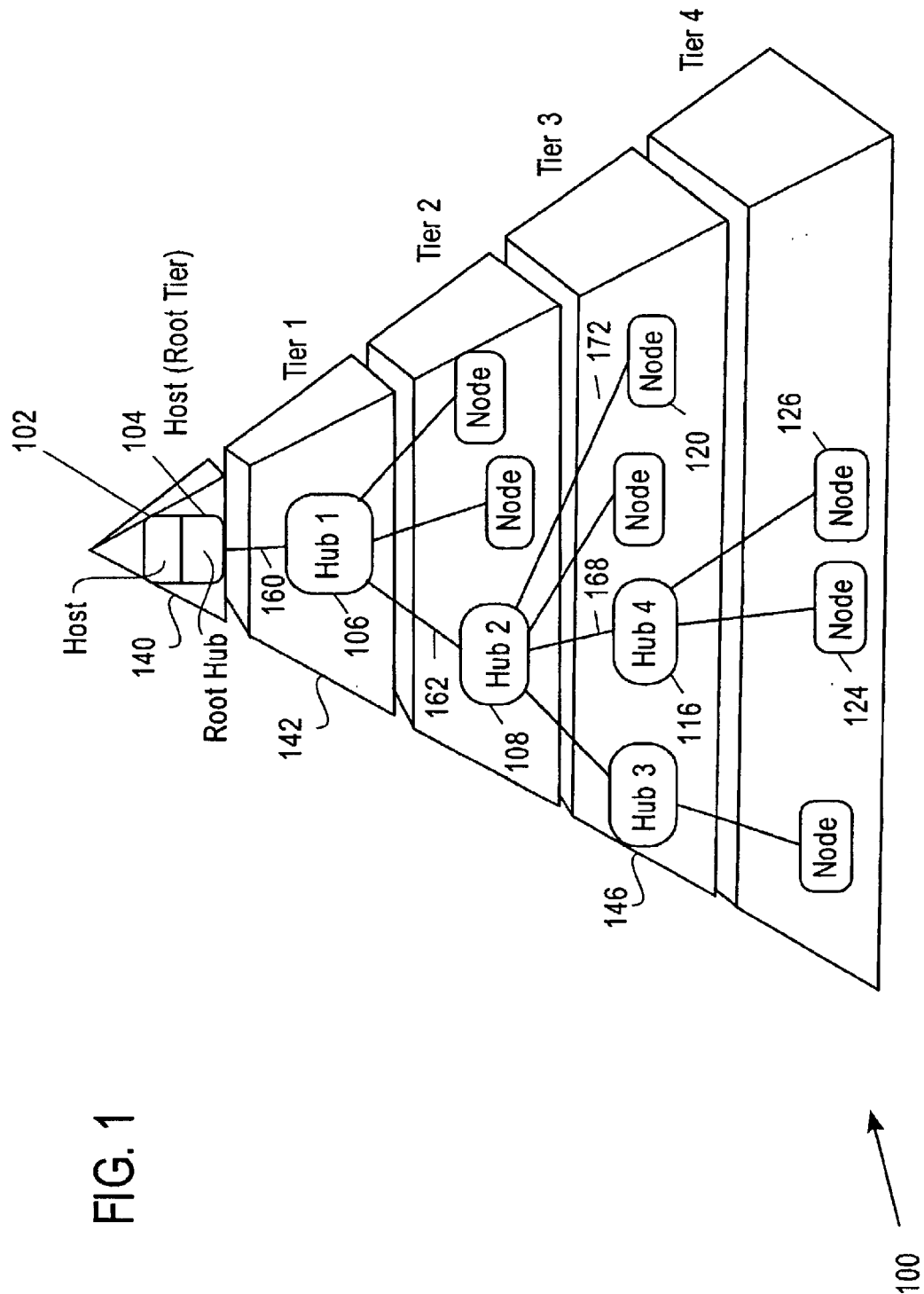
FIG. 1 is a tree connection diagram of a universal serial bus (USB) system.

Referring now to FIG. 1, a tree connection diagram of a universal serial bus (USB) system 100 is shown. The USB system 100 includes a multi-segment bus designed to add or remove low and medium speed peripherals to a central USB host 102. The topology of USB system 100 is called a tiered star. Central USB host 102 has an associated root hub 104 which functions as the master attachment point in USB system 100. This is called a root tier 140. Other devices are attached to USB system 100 at differing degrees of remoteness, called tiers. Each tier is numbered by the number of wire segments signals from devices within the tier must pass to reach the root hub 104. For example, hub 1 106 is connected via a single wire segment 160 to root hub 104 in the root tier 140, so hub 1 106 is said to occupy tier 1 142. Similarly, node 120 is attached indirectly to root hub 104 via 3 wire segments 172, 162, 160, so node 120 is said to occupy tier 3 146.

USB devices are either "hubs" for providing additional attachment points or "functions" for providing peripheral devices for USB host 102. Each USB wire segment has two endpoints. One endpoint serves as a hub port attachment and the other endpoint serves as a function attachment. The wire segments of USB system 100 may be physically attached and physically detached during host 102 operations. Each hub in a USB system 100 can detect the physical presence or physical absence of connected lower-tier devices. For example, if wire segment 168 is physically detached, hub 2 108 recognizes the detachment of all lower-tier devices, namely hub 4 116, node 124, and node 126.

Figure 2:
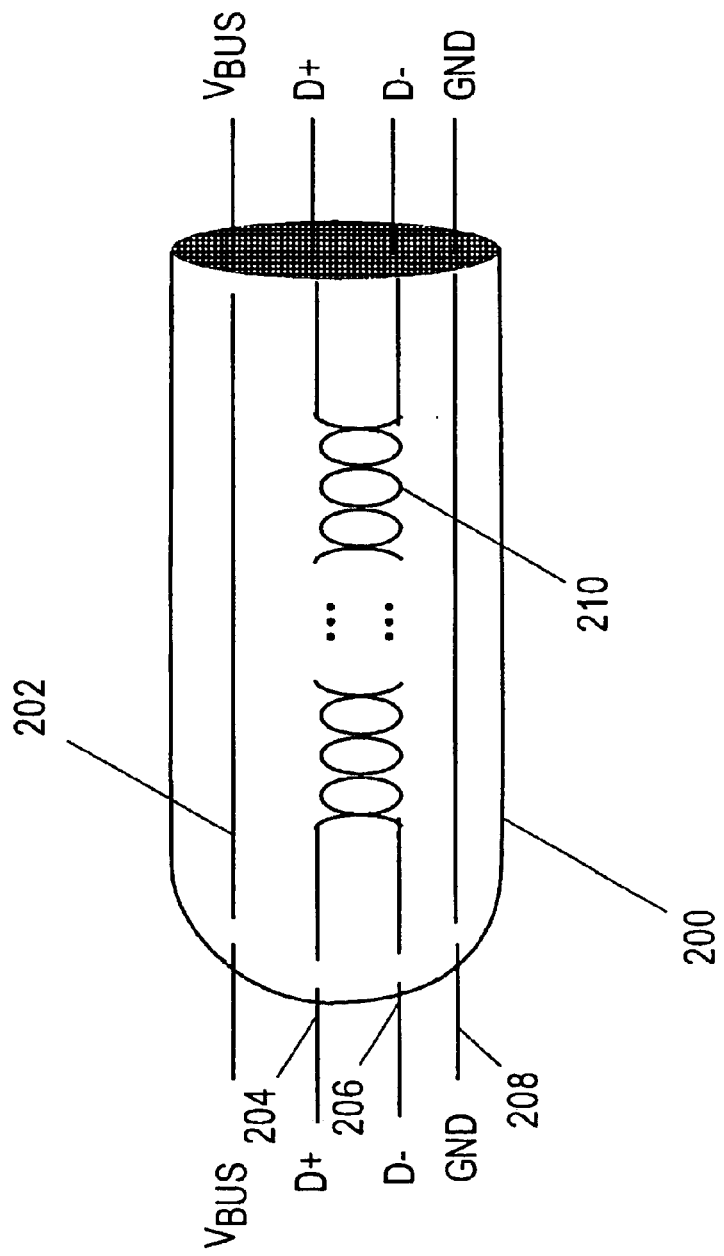
FIG. 2 is a cable signaling diagram of a USB wire segment.

Referring now to FIG. 2, a cable signaling diagram of a USB wire segment 200 is shown. USB uses 4 signal wires in each wire segment 200. These 4 signal wires are Vbus 202, D+ 204, D− 206, and GND 208. Each end of USB wire segment 200 is normally terminated with a 4 pin connector (not shown).

Vbus 202 carries a nominal +5 Vdc signal, whose source is the upstream (next-highest tier level) hub. Vbus 202 provides a signal that may be used not only as a reference voltage but also as a power supply for low-powered USB devices. Similarly, GND 208 carries a power ground and signal ground signal, whose source is also the upstream hub.

D+ 204 and D− 206 signal wires carry the data signals of the USB wire segment 200 as a differential pair. In most applications, D+ 204 and D− 206 signal wires are implemented as a twisted pair 210 within USB wire segment 200.

Two kinds of USB data transfers are supported, referred to as USB full-speed mode and USB low-speed mode. The USB full-speed mode transfers data at a 12.0 Megabit per second (Mb/s) signaling bit rate. The USB low-speed mode transfers data at a 1.5 Mb/s signaling bit rate. Both modes can be supported in the same USB system by automatic dynamic switching between transfers. A non-return-to zero inverted (NRZI) clock travels down the D+ 204 and D− 206 signal wires along with the data.

Figure 3A:
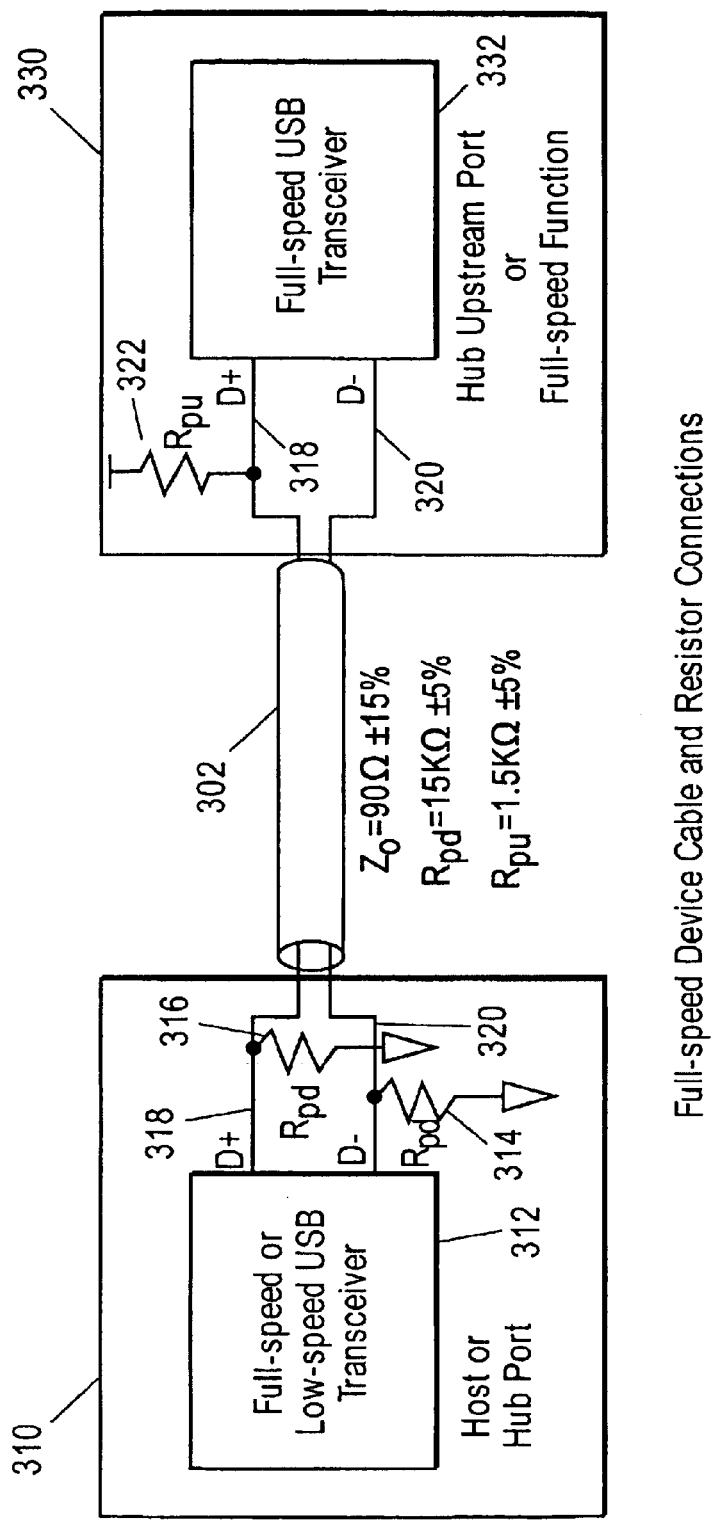
FIG. 3A is a schematic diagram of a pull-up resistor for a USB full-speed mode connection.

Referring now to FIG. 3A, a schematic diagram of a pull-up resistor for a USB full-speed mode connection is shown. Hub port 310 is connected to full-speed function 330 via USB wire segment 302. Hub port 310 may in other embodiments be a root hub port. Hub port 310 includes a USB transceiver 312, which supports both full-speed mode and low-speed mode. Prior to USB wire segment 302 being physically connected between hub port 310 and full-speed function 330, pull-down resistors Rpd 314 and Rpd 316 keep the local D− 320 and D+ 318 signal wires, respectively, near reference ground level.

Function 330 includes a full-speed USB transceiver 332 with associated pull-up resistor Rpu 322. Pull-up resistor Rpu 322 is connected on one end to a voltage source, usually a nominal +5 Vdc, and is connected at the other end to the local D+ 318 signal wire. Once USB wire segment 302 is physically connected, pull-up resistor Rpu 322 causes a positive offset on the D+ 318 signal wire with respect to the D− 320 signal wire. This positive offset is interpreted by USB transceiver 312 of hub port 310 as indicating that full-speed function 330 will, in fact, exchange data using the USB full-speed mode.

Figure 3B:
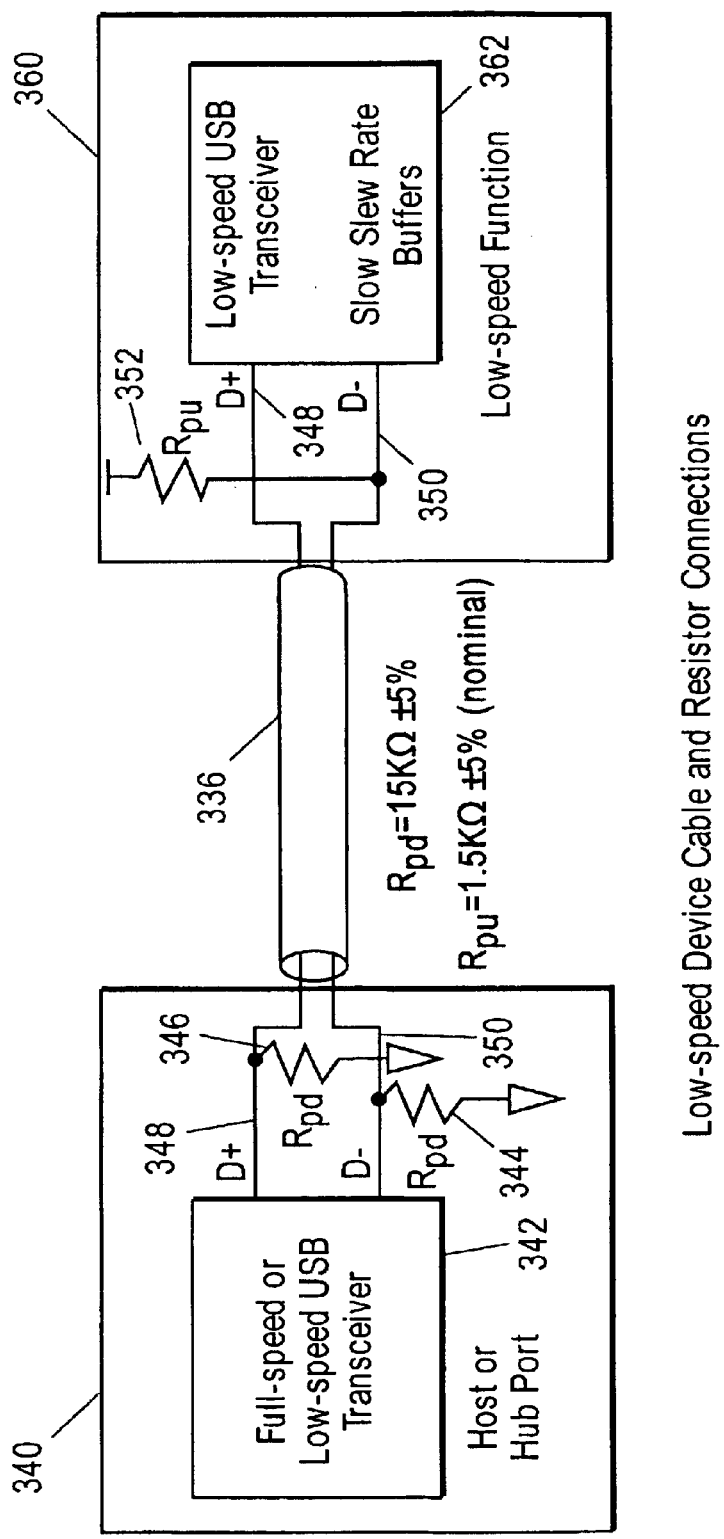
FIG. 3B is a schematic diagram of a pull-up resistor for a USB low-speed mode connection.

Referring now to FIG. 3B, a schematic diagram of a pull-up resistor for a USB low-speed mode connection is shown. Hub port 340 is connected to low-speed function 360 via USB wire segment 336. Hub port 340 may in other embodiments be a root hub port. Hub port 340 includes a USB transceiver 342, which supports both full-speed mode and low-speed mode. As explained above in connection with FIG. 3A, prior to USB wire segment 336 being connected between hub port 340 and low-speed function 360, pull-down resistors Rpd 344 and Rpd 346 keep the local D− 350 and D+ 348 signal wires, respectively, near reference ground level.

Function 360 includes a low-speed USB transceiver 362 with associated pull-up resistor Rpu 352. Pull-up resistor Rpu 352 is connected on one end to a voltage source, usually a nominal +5 Vdc, and, in contrast with the example of FIG. 3A, is connected at the other end to the local D− 350 signal wire. Once USB wire segment 336 is connected, pull-up resistor Rpu 352 causes a positive offset on the D− 350 signal wire with respect to the D+ 348 signal wire. This positive offset is interpreted by USB transceiver 342 of hub port 340 as indicating that low-speed function 360 will, in fact, exchange data using the USB low-speed mode.

In both the FIG. 3A and FIG. 3B embodiments, a second inference is drawn by hub ports 310, 340. The presence of a positive voltage offset on either the D− 320, 350 signal line or the D+ 318, 348 signal line indicates that a function is physically attached via a USB wire segment 302, 336. This indication may be used by hub ports 310, 340 to indicate up through the various tiers of attachment to the host that the function is physically attached. When the host is made aware of the physical attachment of the function, host software may continuously poll the function for data transfers. When the function is quiescent, this polling is unnecessary and may preclude the host from entering into a low-power standby state.

In the FIG. 3A and FIG. 3B embodiments, the only way to cause the host software to cease unnecessary polling of a quiescent function is to physically detach USB wire segment 302, 336 at one or both ends. This physical detachment requires operator intervention. The need for operator attention and intervention may defeat the purpose of automatic systems for host entry into a low-power state due to lack of system activity.

Figure 4:
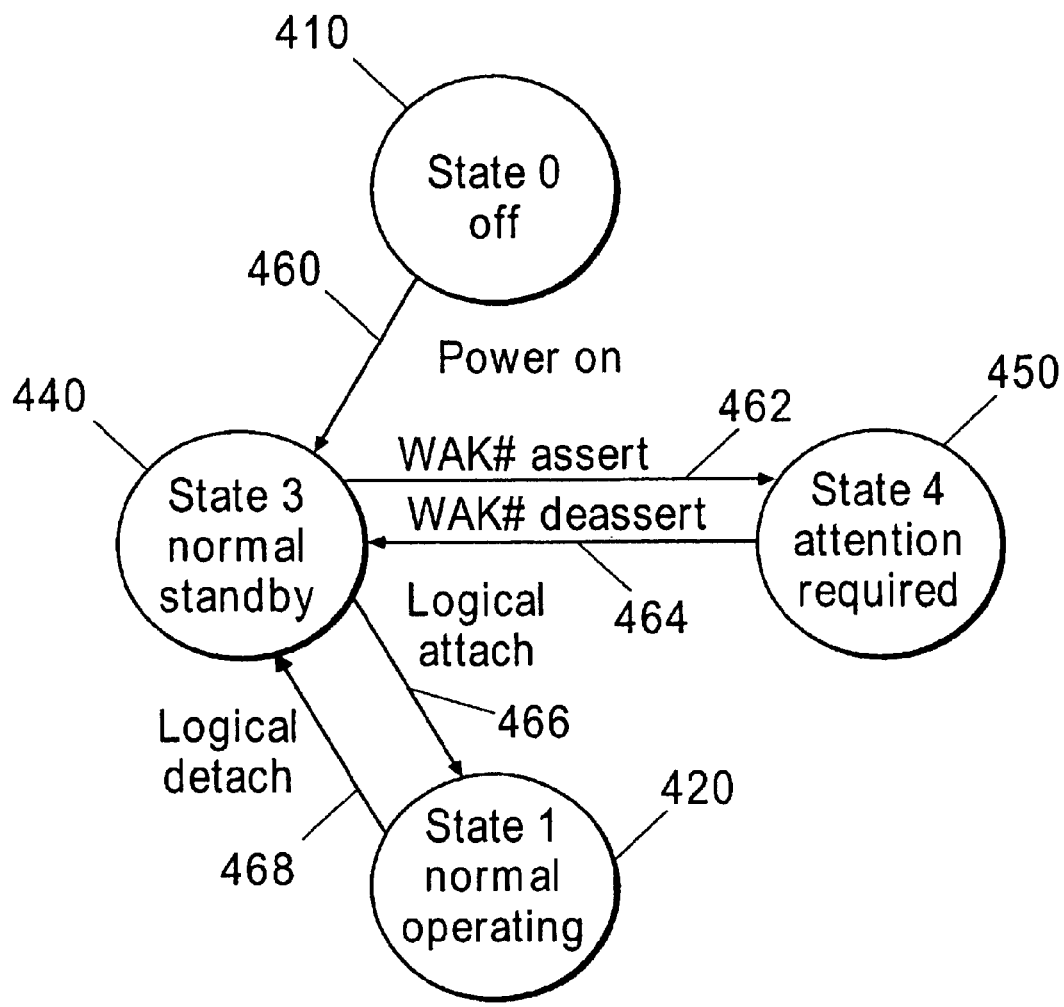
FIG. 4 is a state diagram of a logical attach/detach function, according to one embodiment.

Referring now to FIG. 4, a state diagram of a logical attach/detach function Is shown, according to one embodiment. In the FIG. 3A and FIG. 3B embodiments, a physical detachment was required to prevent unnecessary polling of a quiescent function. The logical attach/detach function described in the FIG. 4 embodiment allows a logical detachment as well as a physical detachment to prevent unnecessary polling when the logical detach function is quiescent.

The logical attach/detach function may include 5 operational states. These may include state 0 410, state 1 420, state 3 440, and state 4 450. All of these states presume that the logical attach/detach function is physically attached to a host via a USB wire segment.

In state 0 410, the logical attach/detach function is powered off. When the host computer is powered on, the Vbus signal on the Vbus signal wire within a USB wire segment arrives at the logical attach/detach function, causing a power on transition 460. At this time logical attach/detach function enters state 3 440, which is a normal standby state. In state 3 440, the logical attach/detach function is logically detached from the host.

While the logical attach/detach function is in state 3 440, the logical attach/detach function may determine that it requires data transmission to or from the host. A wake up signal WAK# assert transition 462 may be caused by the WAK# signal being asserted from the logical attach/detach function to the host. At this time the logical attach/detach function may enter state 4 450, an attention required state. In state 4 450 the logical attach/detach function remains logically detached from the host, but a wake up request is pending. When the host responds to the wake up request, WAK# de-assert transition 464 may be caused by the WAK# signal being de-asserted from the logical attach/detach function to the host. After WAK# de-assert transition 464 the logical attach/detach function re-enters state 3 440.

After responding to a WAK# signal, the host may then perform a logical attach transition 466, which places the logical attach/detach function into state 1 420. In state 1 420, the logical attach/detach function is logically attached to the host, and the host may recognize the attached status of the logical attach/detach function as a full-speed USB device or a low-speed USB device using standard USB protocols. While in state 1 420, and after the host recognizes the attached status of the logical attach/detach function, regular USB data transmissions may occur. When USB data transmissions are no longer required, the host may perform a logical detach transition 468. The logical detach transition 468 places the logical attach/detach function back into state 3 440, causing the logical attach/detach function to again be logically detached from the host.

It is noteworthy that both state 1 420 and state 4 450 may be occupied at the same time by the logical attach/detach function. The logical attach/detach function may cause a WAK# assert transition 462, causing the logical attach/detach function to enter state 4 450. The host may then perform a logical attach transition 466 placing the logical attach/detach function simultaneously into state 1 420. Then, when the logical attach/detach function determines that USB data transfers are no longer required, the logical attach/ detach function may then cause a WAK# de-assert transition 464, causing the logical attach/detach function to exit state 4 450 while remaining in state 1 420. Once the host recognizes the WAK# de-assert transition 464, the host may then perform a logical detach transition 468, causing the logical attach/detach function to exit state 1 420 and reenter state 3 440.

Figure 5:
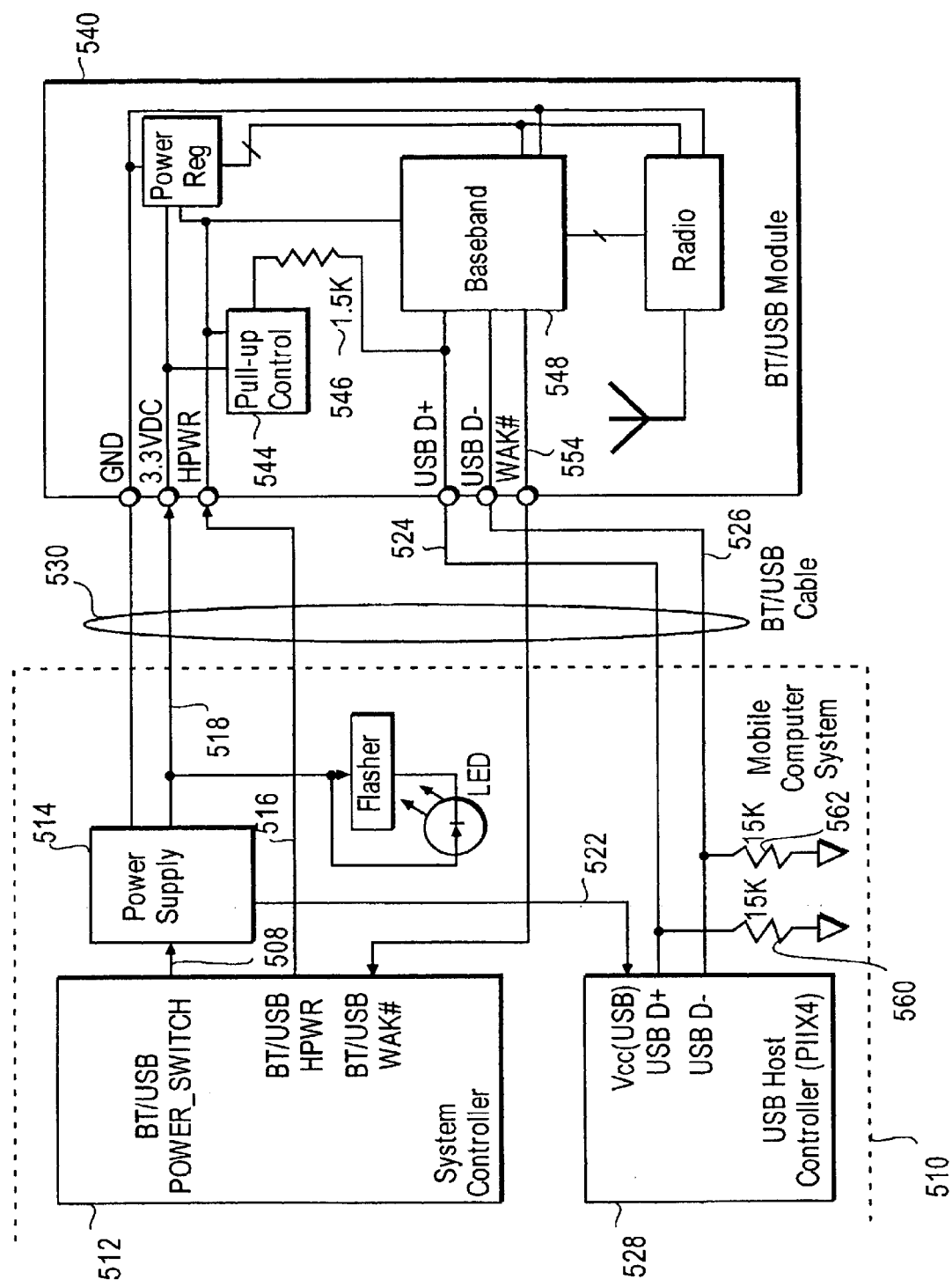
FIG. 5 is a schematic diagram of a USB logical attach/detach connection, according to one embodiment of the present invention.

Referring now to FIG. 5, a schematic diagram of a USB logical attach/detach connection is shown, according to one embodiment of the present invention. In the FIG. 5 embodiment, a single high-speed USB logical attach/detach function 540 is connected to the host 510 via an enhanced USB wire segment 530. In other embodiments, a low-speed USB logical attach/detach function may be used, and more than one USB function may be connected to host 510. The FIG. 5 embodiment is an exemplary bluetooth on USB module, which allows wireless connection to peripherals (not shown). However, in other embodiments any other functionality may be realized by a logical attach/detach function.

In the FIG. 5 embodiment, logical attach/detach function 540 transfers data with host 510 using standard USB signals on D+ signal wire 524 and D− signal wire 526. Baseband signal controller 548 performs the data transfers on the D+ signal wire 524 and D− signal wire 526, and additionally may assert a wake-up signal WAK# on WAK# signal wire 554. Because logical attach/detach function 540 is a full-speed USB function, pull-up resistor 546 is attached at one end to D+ signal wire 524. In other embodiments where logical attach/detach function 540 is a low-speed USB function, pull-up resistor 546 may be attached to the D− signal wire 526 instead. In either case the other end of pull-up resistor 546 is indirectly connected to a biasing voltage through pull-up control 544.

Host 510 includes a power switch 512, a power supply 514, and a host root hub 528. Under logical control of the host 510, power switch 512 may signal the power supply 514 over power supply control signal wire 508. Power supply 514 may then supply power over the Vbus signal wire 518 to logical attach/detach function 540, and may also supply power over the root hub power signal wire 522 to host root hub 528. The following FIG. 5 discussion generally presumes that power supply 514 is supplying power over Vbus signal wire 518 and root hub power signal wire 522.

The power switch 512 may additionally consider the logical state of a WAK# signal on WAK# signal wire 554. When logical attach/detach function 540 asserts WAK#, power switch 512 may then assert a host-power (HPWR) signal on HPWR signal wire 516. Logical attach/detach function 540 may assert WAK# when logical attach/detach function 540 is logically detached but begins to receive data. At other times, the power switch 512 may assert HPWR signal on HPWR signal wire 516 in response to requirements of the host 510. An example of the latter would be when the host 510 wished to make a transmission via logical attach/detach function 540.

The HPWR signal is one form of a detach control signal. When a HPWR signal is asserted on HPWR signal wire 516, pull-up control 544 may connect the Vbus signal from Vbus signal wire 518 to the end of pull-up resistor 546 opposite from the D+ signal wire 524. Pull-up resistor 546 then causes a positive offset on the D+ signal wire 524, which may be recognized by host root hub 528 as a logical attachment of logical attach/detach function 540.

Conversely, when baseband signal controller 548 de-asserts WAK# on WAK# signal line 554, power switch 512 may act on this advisory signal by de-asserting the HPWR signal on HPWR signal line 516. In other situations, power switch 512 may de-assert HPWR in response to requirements of host 510, such as when a data transmission is finished. When HPWR signal is de-asserted, pull-up control 544 may then disconnect the Vbus signal from the Vbus signal wire 518 to the end of pull-up resistor 546 opposite from the D+ signal wire 524. Pull-up resistor 546 then no longer causes a positive offset on the D+ signal wire 524. Since the standard USB pull-down resistors 560, 562 act to pull the D+ and D− signals, respectively, towards ground, the host root hub 528 cannot recognize that logical attach/detach function 540 is, in fact, attached. This situation is one form of a logically detached state. Pull-up control 544 has denied a biasing voltage from pull-up resistor 546, and the resulting lack of offsets on the D+ signal wire 524 and D− signal wire 526 causes a logically detached state. This logically detached state is indistinguishable from a physically detached state from the viewpoint of the host root hub 528.

In the FIG. 5 embodiment, pull-up control 544 may be a switch, in some embodiments either a bipolar transistor or a metal-oxide-semiconductor field-effect-transistor (MOSFET). In other embodiments, a junction-field-effect-transistor (JFET) or a mechanical relay may be used, or any other device which may switch power or signals.

Figure 6:
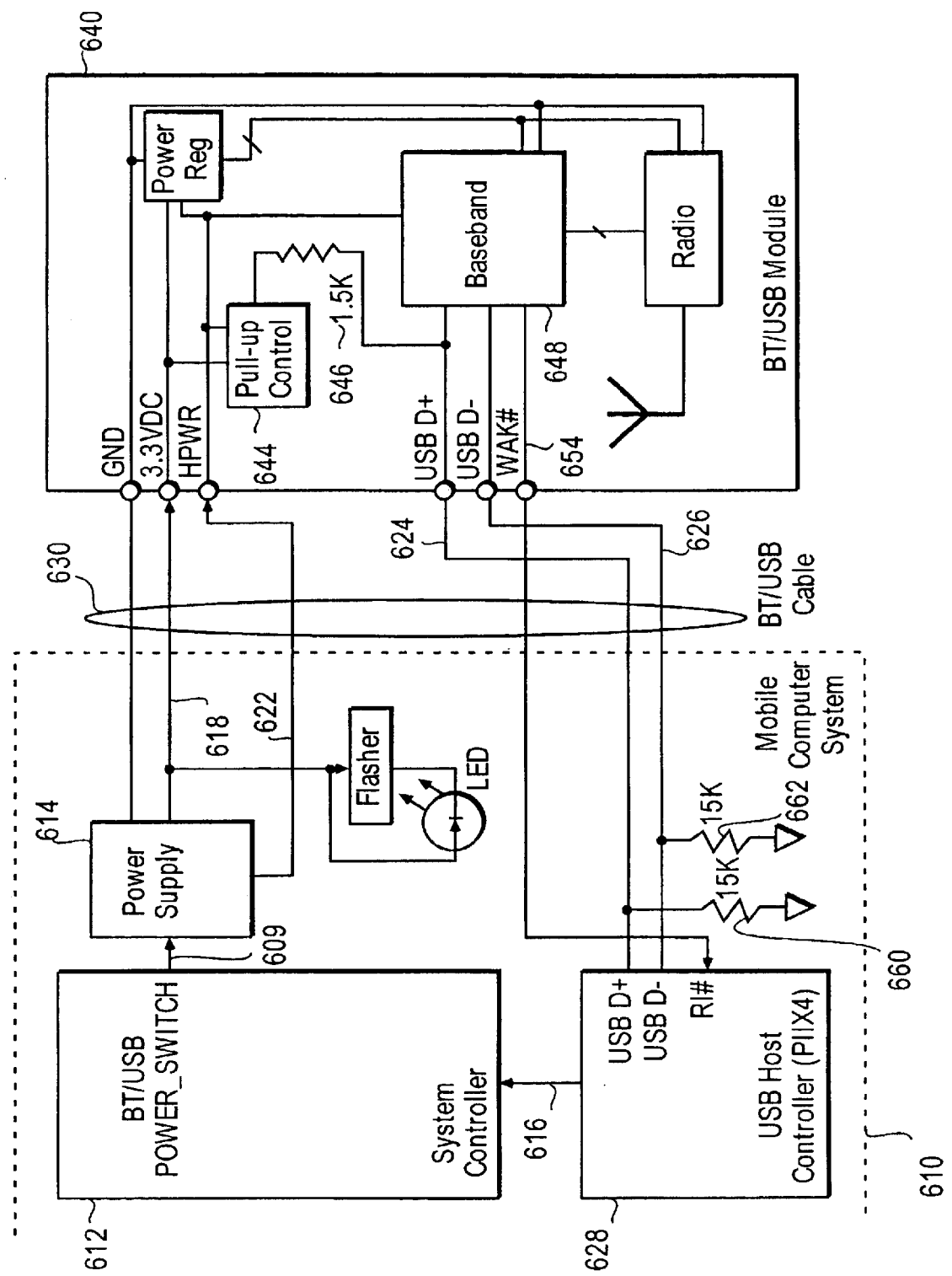
FIG. 6 is a schematic diagram of a USB logical attach/detach connection, according to another embodiment of the present invention

Referring now to FIG. 6, a schematic diagram of a USB logical attach/detach connection is shown, according to another embodiment of the present invention. In the FIG. 6 embodiment, a single high-speed USB logical attach/detach function 640 is connected to the host 610 via an enhanced USB wire segment 630, in a similar manner to the FIG. 5 embodiment. In the FIG. 6 embodiment, logical attach/detach function 640 transfers data with host 610 using standard USB signals on D+ signal wire 624 and D− signal wire 626. Baseband signal controller 648 performs the data transfers on the D+ signal wire 624 and D− signal wire 626, and additionally may assert a wake up WAK# signal on WAK# signal wire 654. Because logical attach/detach function 640 is a full-speed USB function, pull-up resistor 646 is attached at one end to D+ signal wire 624.

Host 610 includes a power switch 612, a power supply 614, and a host root hub 628. Under logical control of the host 610, power switch 612 may signal the power supply 614 over power supply control signal wire 608. Power supply 614 may then supply power over the Vbus signal wire 618 to logical attach/detach function 640. The following FIG. 6 discussion generally presumes that power supply 614 is supplying power over Vbus signal wire 618.

In contrast to the FIG. 5 embodiment, in the FIG. 6 embodiment the host root hub 628 may consider the logical state of a WAK# signal on WAK# signal wire 654. When logical attach/detach function 640 asserts WAK#, host root hub 628 may signal the power switch 612 over power switch control signal wire 616. The power switch 612 may then in turn signal the power supply 614 over power supply control signal wire 608. Power supply 614 may then supply a signal HPWR on HPWR signal wire 622 to pull-up control 644 and power regulator 642. In other situations, the power switch 612 may assert HPWR signal on HPWR signal wire 622 in response to requirements of host 610.

When signal HPWR Is asserted on HPWR signal wire 622, pull-up control 644 may connect the Vbus signal from Vbus signal wire 618 to the end of pull-up resistor 646 opposite from the D+ signal wire 624. Pull-up resistor 646 then causes a positive offset on the D+ signal wire 624, which may be recognized by host root hub 628 as a logical attachment of logical attach/detach function 640.

Conversely, when baseband signal controller 648 de-asserts WAK# on WAK# signal line 654, host root hub 628 and thence power switch 612 may act on this advisory signal by de-asserting signal HPWR on HPWR signal line 622. In other situations, power switch 612 may de-assert HPWR signal on HPWR signal line 622 in response to requirements from host 610. When signal HPWR is removed, pull-up control 644 may then disconnect the Vbus signal from the Vbus signal wire 618 to the end of pull-up resistor 646 opposite from the D+ signal wire 624. Pull-up resistor 646 then no longer causes a positive offset on the D+ signal wire 624. Since the standard USB pull-down resistors 660, 662 act to pull the D+ and D− signals, respectively, towards ground, the host root hub 628 cannot recognize that logical attach/detach function 640 is, in fact, attached. This situation is one form of a logically detached state. Pull-up control 644 has denied a biasing voltage from pull-up resistor 646, and the resulting lack of offsets on the D+ signal wire 624 and D− signal wire 626 causes a logically detached state. This logical detached state is indistinguishable from a physically detached state from the viewpoint of the host root hub 628.

Figure 7:
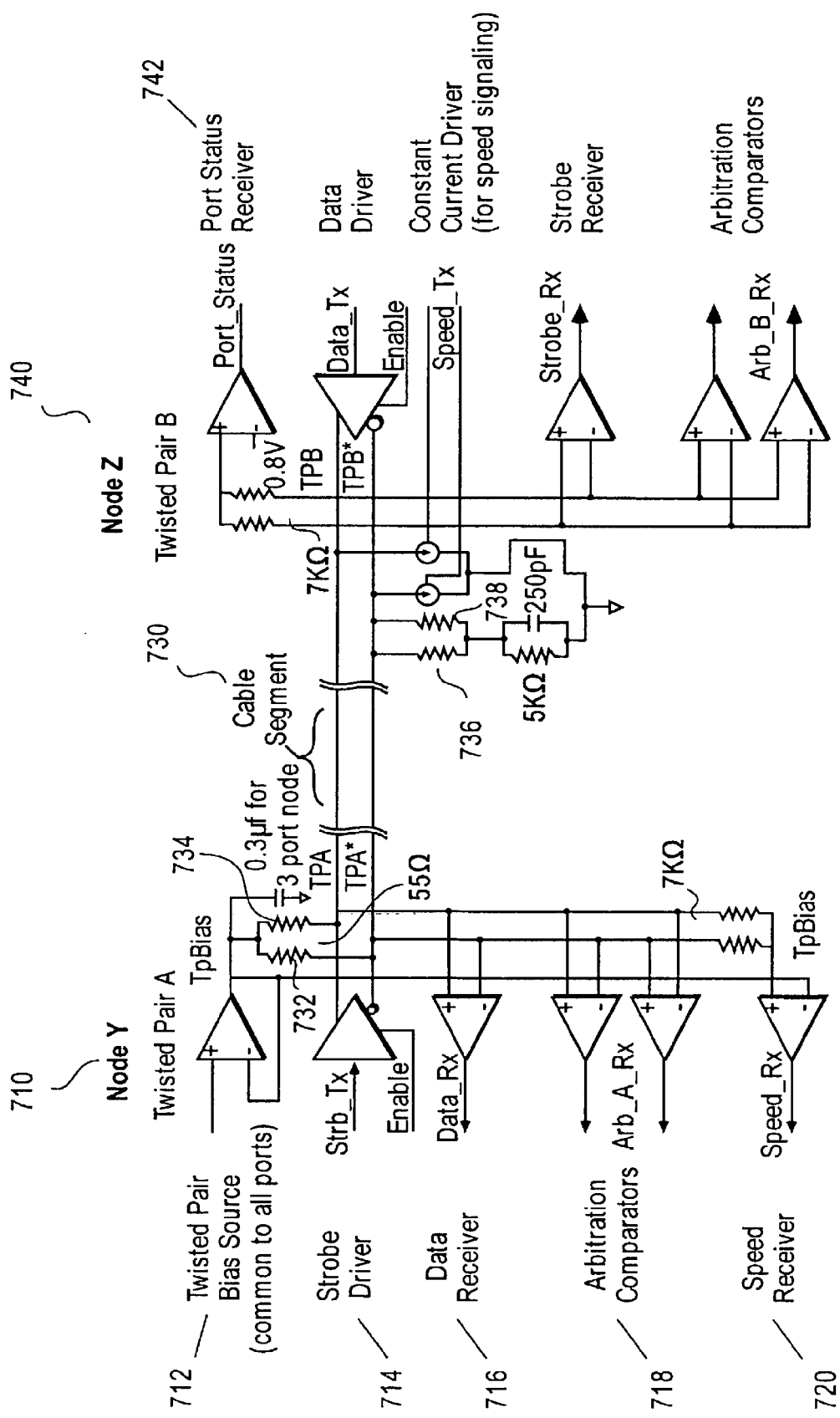
FIG. 7 is a schematic diagram of an IEEE 1394 bus connection.
Figure 7:
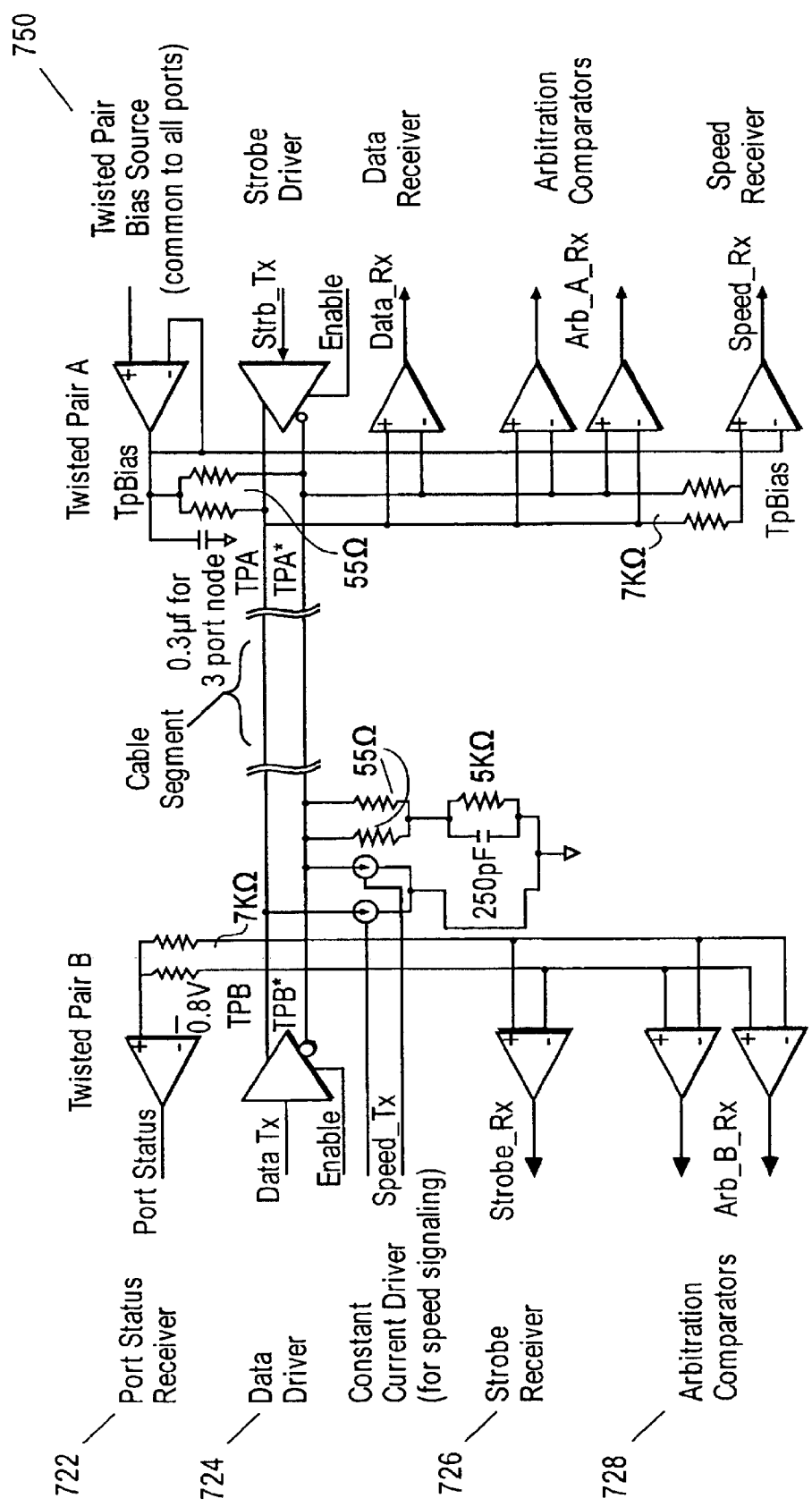

Referring now to FIG. 7, a schematic diagram of an IEEE 1394 bus connection is shown. In contrast with the USB, the IEEE 1394 bus may connect peers, such as two computers or two intelligent peripherals. Therefore the IEEE 1394 bus is symmetric and provides for physical attachment/detachment recognition for both sides of the interface.

FIG. 7 illustrates an IEEE 1394 interface between node Y 710 and node Z 740 via cable segment 730. Cable segment 730 carries signals on two twisted pairs of wires. Each node on the IEEE 1394 interface has circuitry intended for signaling over a twisted pair A and a twisted pair B. For example, for twisted pair A, node Y 710 provides a twisted pair bias source 712, a strobe driver 714, a data receiver 716, a pair of arbitration comparators 718, and a speed receiver 720. For twisted pair B, node Y 710 provides a port status receiver 722, a data driver 724, a strobe receiver 726, and a pair of arbitration comparators 728. In general, the twisted pair A circuits of node Y 710 allow node Y 710 to receive data from the twisted pair B circuits of node Z 740, and the twisted pair B circuits of node Y 710 allow node Y 710 to transmit data to the twisted pair A circuits of node Z 740.

Figure 8:
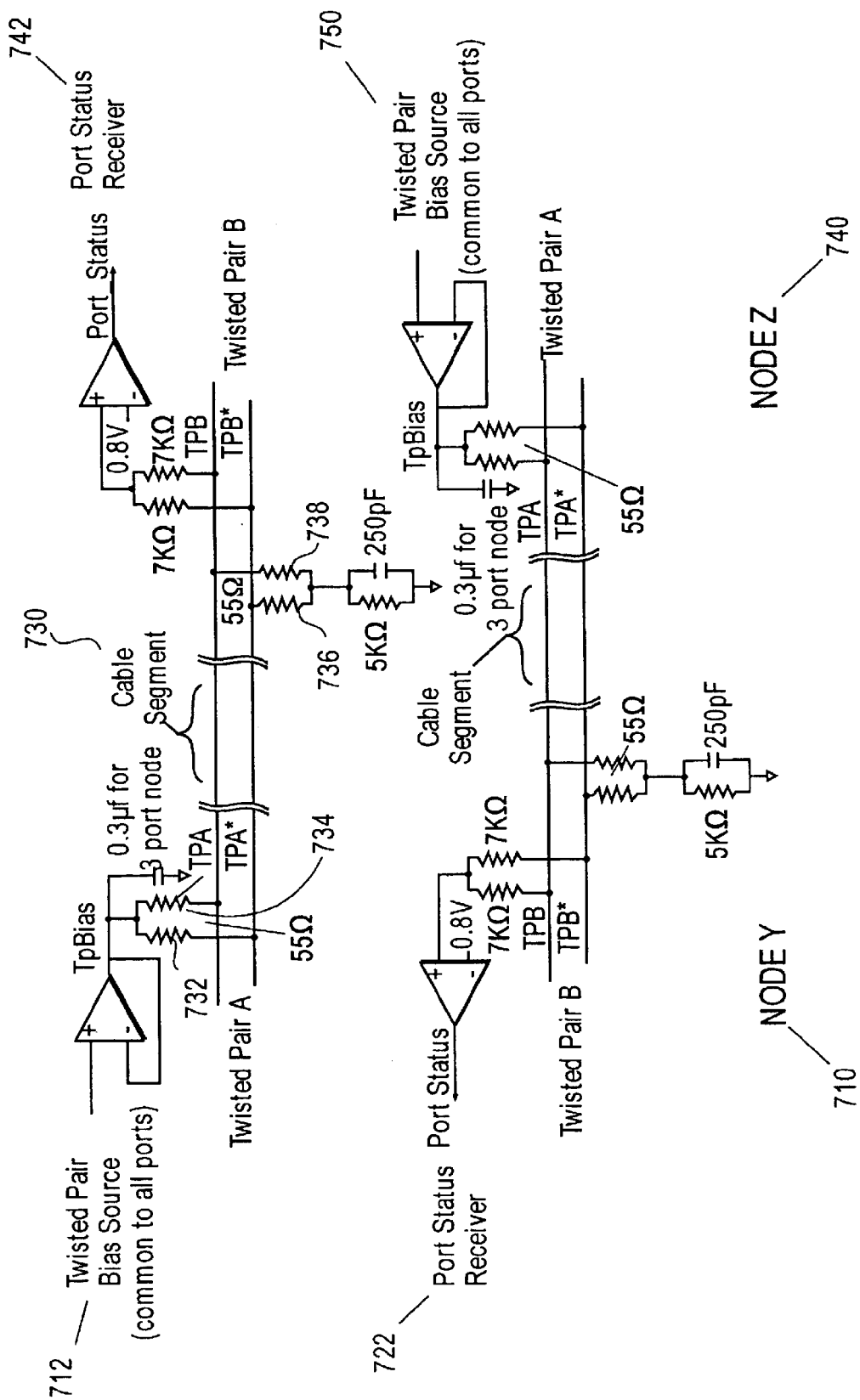
FIG. 8 is a schematic diagram of an IEEE 1394 bus pull-up resistor bias source.

Referring now to FIG. 8, a schematic diagram of an IEEE 1394 bus pull-up resistor bias source is shown. Node Z 740 may detect the physical attachment of node Y 710 due to a voltage bias provided by twisted pair bias source 712. Twisted pair bias source 712 includes a pair of pull-up resistors 732, 734, which supply a biasing voltage TpBias to a twisted pair within cable segment 730 when node Z 740 is attached to node Y 710 with cable segment 730. Biasing voltage TpBias is split by the action of the pull-up resistors 732, 734, and the pull-down resistors 736, 738, which are connected at one end to AC ground within node Z 740. Port status receiver 742 may note the presence of this split biasing voltage on the twisted pair wires, and indicate this presence to other circuits within node Z 740 as an indication of the physical attachment of node Y 710.

When node Y 710 is physically detached from node Z 740, the pull-down resistors 736, 738 pull down the voltage on the twisted pair wires. Port status receiver 742 may note the absence of a split biasing voltage on the twisted pair wires, and indicate this absence to other circuits within node Z 740 as an indication of the physical detachment of node Y 710

It is noteworthy that twisted pair bias source 750 and port status receiver 722 provide a similar capability for node Y 710 to detect the physical attachment and physical detachment of node Z 740.

Figure 9:
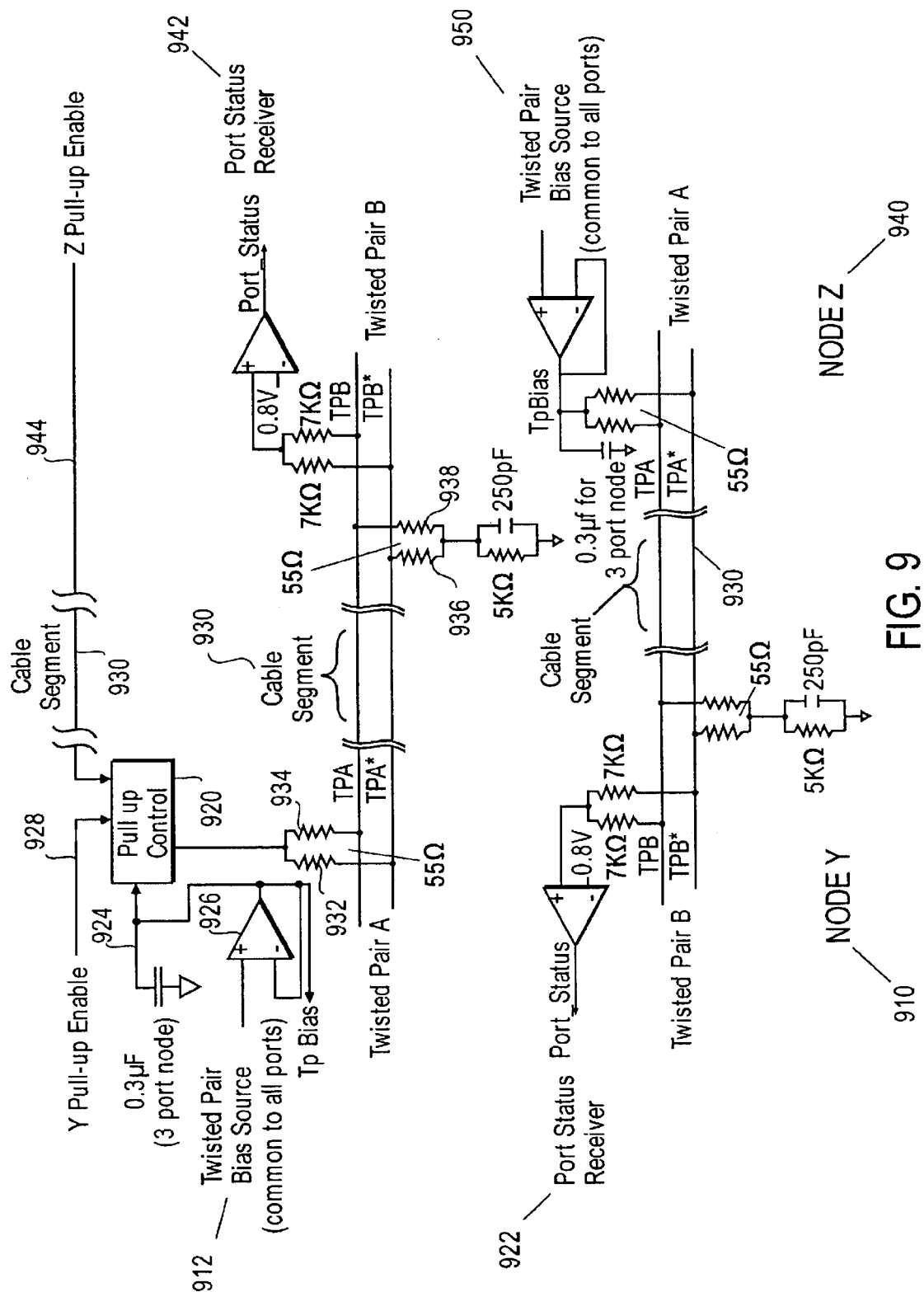
FIG. 9 is a schematic diagram of an IEEE 1394 logical attach/detach connection, according to one embodiment of the present invention.

Referring now to FIG. 9, a schematic diagram of an IEEE 1394 logical attach/detach connection is shown, according to one embodiment of the present invention. In the FIG. 9 example, node Y 910 may remain physically attached to node Z 940 via cable segment 930. The twisted pair A circuitry of node Y 910 includes a twisted pair bias source 912. The twisted pair bias source 912 includes an amplifier 926, a pair of pull-up resistors 932, 934, a TpBias node 924, and a pull-up control 920. Pull-up control 920 may connect or disconnect biasing voltage TpBias from TpBias node 924 to one end of pull-up resistors 932, 934 under the control of a Y pull-up enable signal on Y pull-up enable signal wire 928. Pull-up control 920 may additionally connect or disconnect biasing voltage TpBias from TpBias node 924 to one end of pull-up resistors 932, 934 under the control of a Z pull-up enable signal on Z pull-up enable signal wire 944.

In a situation where a logical attachment of node Y 910 to node Z 940 is required by node Y 910, called a "local attachment", circuitry within node Y 910 may assert a Y pull-up enable signal on Y pull-up enable signal wire 928. This assertion may cause pull-up control 920 to connect biasing voltage TpBias to one end of pull-up resistors 932, 934. This in turn causes an offset on the twisted pair wires which is detected by port status receiver 942 of node Z 940. The output of port status receiver 942 may be used by other circuitry within node Z 940 to indicate that node Y 910 is logically attached.

Conversely, when a logical attachment of node Y 910 to node Z Is required by node Z 940, called a "remote attachment", circuitry within node Z 940 may assert a Z pull-up enable signal on Z pull-up enable signal wire 944. This assertion again may cause pull-up control 920 to connect biasing voltage TpBias to one end of pull-up resistors 932, 934. This in turn causes an offset on the twisted pair wires which is detected by port status receiver 942 of node Z 940.

When the opposite situation is required, where a logical detachment of node Y 910 to node Z 940 is required by node V 910, called a "local detachment", circuitry within node Y 910 may de-assert a pull-up enable signal on pull-up enable signal wire 928. This de-assertion may cause pull-up control 920 to disconnect biasing voltage TpBias from one end of pull-up resistors 932, 934. This in turn removes the offset voltage on the twisted pair wires, as the pull-down resistors 936, 938 will pull the twisted pair wires down towards ground. This removal of the offset voltage is detected by port status receiver 942 of node Z 940. The new output of port status receiver 942 may be used by other circuitry within node Z 940 to indicate that node Y 910 is logically detached, even though node Y 910 remains physically attached to node Z 940 via cable segment 930.

Similarly, when a logical detachment of node Y 910 to node Z 940 is required by node Z 940, called a "remote detachment", circuitry within node Z 940 may de-assert a Z pull-up enable signal on Z pull-up enable signal wire 944. This de-assertion may cause pull-up control 920 to disconnect biasing voltage TpBias from one end of pull-up resistors 932, 934. This in turn removes the offset voltage on the twisted pair wires, as the pull-down resistors 936, 938 will pull the twisted pair wires down towards ground. This removal of the offset voltage is again detected by port status receiver 942 of node Z 940.

In the above discussion, a logical detachment detected by port status receiver 942 of node Z 940 could cause node Z 940 to consider itself detached from node Y 910. However, node Y 910 could still detect its own attachment to node Z 940 via twisted pair bias source 950 and port status receiver 922. In the FIG. 9 embodiment, this asymmetry exists, and in certain applications may be advantageous. In other embodiments, a pull-up control similar to pull-up control 920 of twisted pair bias source 912 could be configured with twisted pair bias source 950. Each side of the interface could then initiate a logical detachment from or logical attachment to the other side.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:

providing a first resistor with a first end and a second end, said first end coupled to a switch and said second end coupled to a serial data bus wire at a near end of a serial data bus;

controlling said switch with a detach control signal sent on a detach control signal wire separate from data transmission wires of said serial data bus from a far end of said serial data bus to cause an apparatus containing said first resistor and said switch to enter a logically detached state;

influencing said detach control signal with a wake-up signal sent on a wake-up signal wire separate from said data transmission wires of said serial data bus from said near end of said serial data bus to said far end of said serial data bus; and switching a biasing voltage from said resistor utilizing said switch.

2. The method of claim 1, wherein said first resistor is configured as a pull-up resistor.

3. The method of claim 2, further comprising detecting said switching of said biasing voltage.

4. The method of claim 3, further comprising determining a logically detached state responsive to said detecting.

5. The method of claim 1, wherein said detach control signal is asserted when said wake-up signal is de-asserted.

6. An apparatus, comprising:

a first resistor with a first end and a second end;

a switch coupled to said first end of said first resistor and to a bias voltage;

a detach control signal wire separate from data transmission wires of a serial data bus coupled to said switch at a near end of said serial data bus, to receive a detach control signal sent from a far end of said serial data bus to cause said apparatus to enter a logically detached state;

a wake-up signal wire separate from said data transmission wires of said serial data bus to send a wake-up signal from said near end of said serial data bus to said far end of said serial data bus to influence said detach control signal; and a serial data bus;wire of said serial data bus coupled to said second end of said first resistor.

7. The apparatus of claim 6, wherein said switch may apply said bias voltage to said first end of said first resistor responsively to said detach control signal on said detach control signal wire.

8. The apparatus of claim 7, wherein said detach control signal is asserted when said wake-up signal is de-asserted.

9. The apparatus of claim 6, wherein said serial data bus carries universal serial bus data.

10. The apparatus of claim 6, wherein said serial data bus carries IEEE-1394 bus data.

11. The apparatus of claim 6, further comprising a second resistor with a first end and a second end, said first end coupled to said serial data bus wire.

12. The apparatus of claim 11, wherein said second end of said second resistor is coupled to signal ground.

13. An apparatus, comprising:

means for providing a first resistor with a first end and a second end, said first end coupled to a switch and said second end coupled to a serial data bus wire at a near end of a serial data bus;

means for controlling said switch with a detach control signal sent on a detach control signal wire separate from data transmission wires of said serial data bus from a far end of said serial data bus to cause said apparatus to enter a logically detached state;

means for influencing said detach control signal with a wake-up signal sent on a wake-up signal wire separate from said data transmission wires of said serial data bus from said near end of said serial data bus to said far end of said serial data bus; and means for switching a biasing voltage from said resistor utilizing said switch.

14. The apparatus of claim 13, further comprising means for detecting said switching of said biasing voltage.

15. The apparatus of claim 13, wherein said detach control signal is asserted when said wake-up signal is de-asserted.

16. A system, comprising:

a serial data bus with a near end and a far end;

a first circuit, coupled to said near end, including a first resistor with a first end and a second end, a switch coupled to said first end of said first resistor and to a bias voltage, a serial data bus wire of said data bus coupled to said second end of said first resistor, a detach control signal wire separate from data transmission wires of said serial data bus coupled to said switch to receive a detach control signal sent from said far end of said serial data bus to said near end of said serial data bus, and a wake-up control signal wire separate from said data transmission wires of said serial data bus to send a wake-up signal from said near end of said serial data bus to said far end of said serial data bus; and a second circuit, coupled to said far end, to send said detach control signal responsive to said wake-up signal to cause said first circuit to enter a logically detached state.

17. The system of claim 16, wherein said switch may apply said bias voltage to said first end of said first resistor responsively to said detach control signal.

18. The system of claim 16, wherein said detach control signal is asserted when said wake-up signal is de-asserted.

* * * * *